United States Patent [19]

Mineo

[11] Patent Number: 4,947,318
[45] Date of Patent: Aug. 7, 1990

[54] DATA PROCESSING SECURITY SYSTEM FOR AUTOMATICALLY TRANSFERRING SOFTWARE PROTECTION DATA FROM REMOVABLE STORE INTO INTERNAL MEMORY UPON MOUNTING OF STORES

[75] Inventor: Akira Mineo, Sagamihara, Japan

[73] Assignee: Hitachi, Ltd., Tokyo, Japan

[21] Appl. No.: 671,877

[22] Filed: Nov. 15, 1984

[30] Foreign Application Priority Data

Nov. 16, 1983 [JP] Japan ................... 58-215554

[51] Int. Cl.$^5$ .............. G06F 12/14; G06F 9/06; G06F 13/12
[52] U.S. Cl. .................. 364/200; 364/236.2; 364/246.2; 364/246.3; 364/247.2; 364/248.1; 364/246.6; 364/246.7; 364/246.9; 364/260.81; 364/286.4; 380/4; 380/25
[58] Field of Search ... 364/200 MS File, 900 MS File; 380/3, 4, 25

[56] References Cited

U.S. PATENT DOCUMENTS

| | | | |
|---|---|---|---|
| 3,377,624 | 4/1968 | Nelson et al. | 364/200 |
| 3,378,818 | 4/1968 | Adelaar et al. | 364/200 |
| 3,576,544 | 4/1971 | Cordero, Jr. et al. | 364/200 |
| 3,893,084 | 7/1975 | Kotok et al. | 364/200 |
| 3,978,454 | 8/1976 | Willard | 364/900 |
| 4,038,645 | 7/1977 | Birney et al. | 364/200 |
| 4,118,789 | 10/1978 | Casto et al. | 364/900 |
| 4,262,332 | 4/1981 | Bass et al. | 364/200 |
| 4,366,537 | 12/1982 | Heller et al. | 364/200 |
| 4,434,464 | 2/1984 | Suzuki et al. | 364/200 |
| 4,434,471 | 2/1984 | Hildinger | 364/900 |
| 4,462,076 | 7/1984 | Smith | 364/200 |
| 4,462,078 | 7/1984 | Ross | 364/300 |
| 4,513,389 | 4/1985 | Devchoudhury | 364/900 |
| 4,550,350 | 10/1985 | Billings | 360/15 |
| 4,558,176 | 12/1985 | Arnold et al. | 364/900 |
| 4,573,119 | 2/1986 | Westheimer et al. | 364/200 |
| 4,590,557 | 5/1986 | Lillie | 364/200 |
| 4,593,353 | 6/1986 | Pickholtz | 364/200 |
| 4,652,990 | 3/1987 | Pailen et al. | 364/200 |
| 4,740,890 | 4/1988 | Tobin | 364/200 |
| 4,799,635 | 1/1989 | Nakagawa | 364/900 |

Primary Examiner—Archie E. Williams, Jr.
Assistant Examiner—Emily Y. Chan
Attorney, Agent, or Firm—Antonelli, Terry, Stout & Kraus

[57] ABSTRACT

In a computer system in which a storage unit is accessed by a host computer, protection key information for each of a plurality of areas of a storage volume, is stored into the storage volume mounted in the storage unit. When the storage volume is mounted on the storage unit, the storage unit reads out protection key information stored in the storage volume and stores it into a memory provided in the storage unit. When an access request for one of the plurality of areas of the storage volume is received from the host computer, the access request is collated with the protection key information stored in the memory relating to the requested area, and the access request is permitted or inhibited in accordance with the collating result.

12 Claims, 7 Drawing Sheets

DATA PROCESSING SECURITY SYSTEM FOR AUTOMATICALLY TRANSFERRING SOFTWARE PROTECTION DATA FROM REMOVABLE STORE INTO INTERNAL MEMORY UPON MOUNTING OF STORES

BACKGROUND OF THE INVENTION

1. Field of the Invention

The present invention relates to protection of data stored in a storage volume, and more particularly to a protection system for data stored in a storage volume in a data processing system including a high order unit, such as a host computer, and a storage unit having the storage volume, such as a magnetic disc pack or a magnetic tape, which is accessible by the high order unit.

2. Description of the Prior Art

When the host computer accesses the data stored in the storage volume loaded in the storage unit, it may improperly access data in the storage volume. In order to prevent such improper accessing and protect the data in the storage volume, the following methods have been commonly used.

In a first method, areas in the storage volume are protected for each data set. In a typical example, a password is checked by a program in the host computer, or a range of input/output addresses is checked. However, in those methods, information for checking whether the access is improper or not is stored in main memory of the host computer. Accordingly, when a program capable of updating the content of the main memory, a program capable of referring to a password area or a program capable of invalidating checking of an access range is executed improperly or an error occurs, the leakage of the data and destruction of the data cannot be prevented.

In a second method, an entire storage volume is protected volume by volume. A typical example is write protection using a write protection switch arranged on a control panel of the storage unit. However, since read protection is not effected in such an arrangement, the protection of the data for each data set in the first method must be employed to provide protection for the leakage of the data. Further, if an operator forgets to set the write protection switch, there is a risk of destroying the volume. U.S. Pat. No. 4,434,464 discloses such a method for protecting data.

SUMMARY OF THE INVENTION

It is an object of the present invention to provide a data processing system which protects writing or reading of data in a storage volume without a host computer or manipulation by an operator.

In order to achieve the above object, in accordance with data security of the data processing system of the present invention, information for protecting data in a storage volume is stored in the storage volume. When the storage volume is loaded into a storage unit, the data protection information stored in the storage volume is automatically read out of the storage volume and stored in a memory of the storage unit by the internal control unit of the storage unit, and the data protection information stored in the memory is correlated with an access request for data in the storage volume to check the validity of the data access so that the specified data in the storage volume is protected from an invalid or unjust access without the aid of host computer or operation by the operator.

DESCRIPTION OF THE PREFERRED EMBODIMENTS

Figure 1:
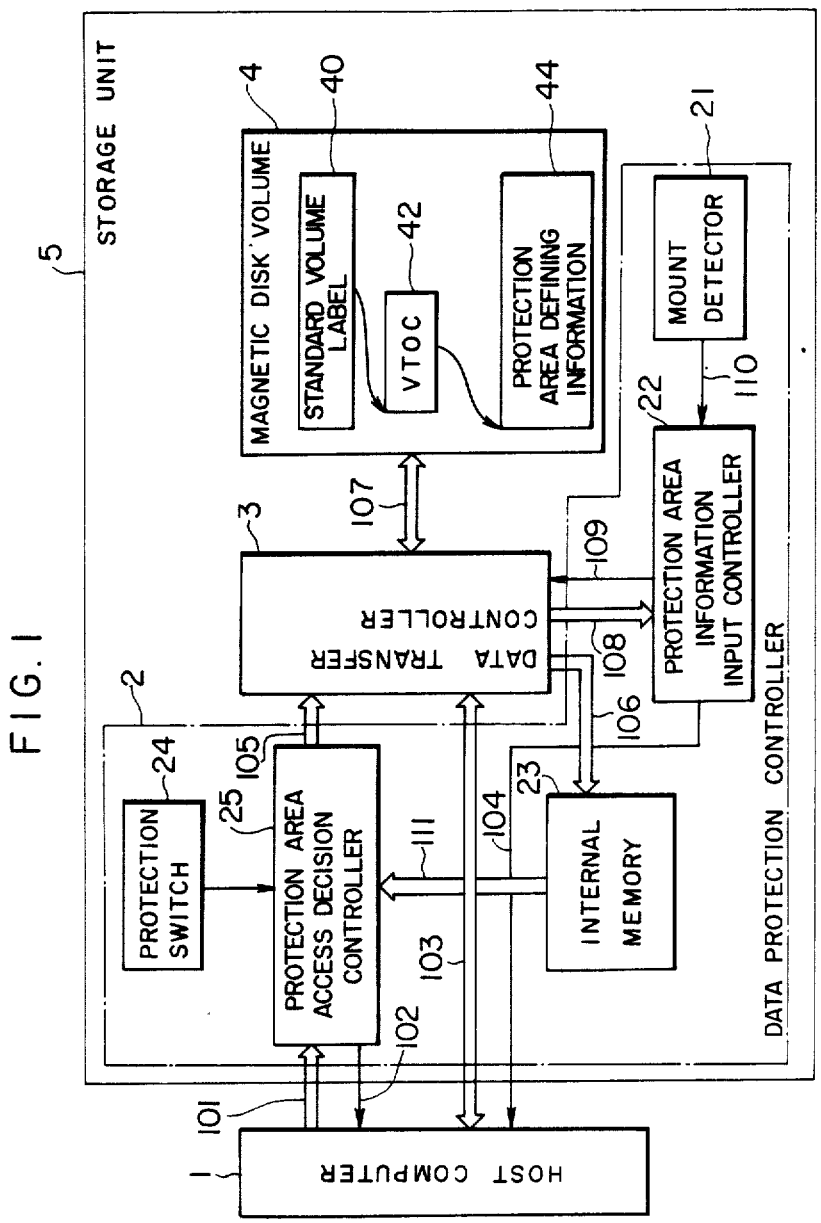
FIG. 1 is a block diagram showing the configuration of one embodiment of the present invention.

FIG. 1 shows a block diagram of one embodiment of the present invention. In FIG. 1, numeral 1 denotes a host computer, and numeral 5 denotes a storage unit which comprises a data protection controller 2, a data transfer controller 3 and a storage volume 4.

In the following description, the storage volume 4 is assumed to be a magnetic disk pack which is herein referred to as a magnetic disk volume.

The data protection controller 2 comprises a mount detector 21, a protection area information input controller 22, an internal memory 23 for storing protection area defining information, a protection switch 24 and a protection area access decision controller 25.

The protection area information input controller 22 causes information to be read out from the magnetic disk volume 4 to define a data protection area when the magnetic disk volume 4 is mounted on the storage unit 5, and the protection area access decision controller 25 has a function to check the validity of an access request by a read/write input/output command.

The construction of the magnetic disk volume 4 now will be explained with reference to FIG. 2.

Figure 2:
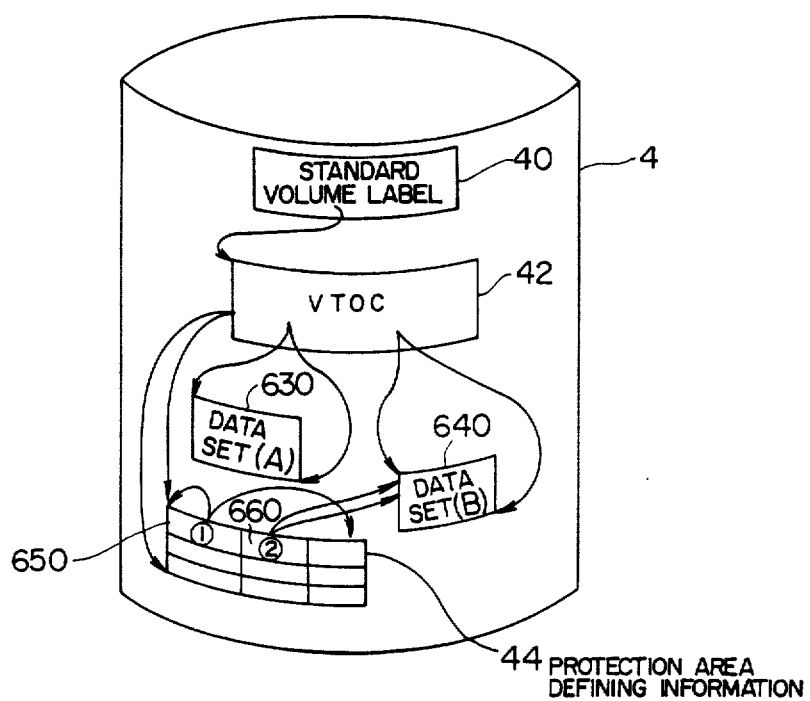
FIG. 2 is an illustration of the content of a magnetic disk volume.

Referring to FIG. 2, the magnetic disk volume 4 stores a standard volume label 40, VTOC (volume table of contents) 42, a data set A 630, a data set B 640 and other unused areas.

The standard volume label 40 identifies the magnetic disk volume 4 and it is usually stored at cylinder 0, track 0. The standard volume label 40 includes therein an address (CCHH) of the VTOC 42. Information for identifying a data set formed on the magnetic disk volume 4 is also recorded in the VTOC 42.

Figure 3:
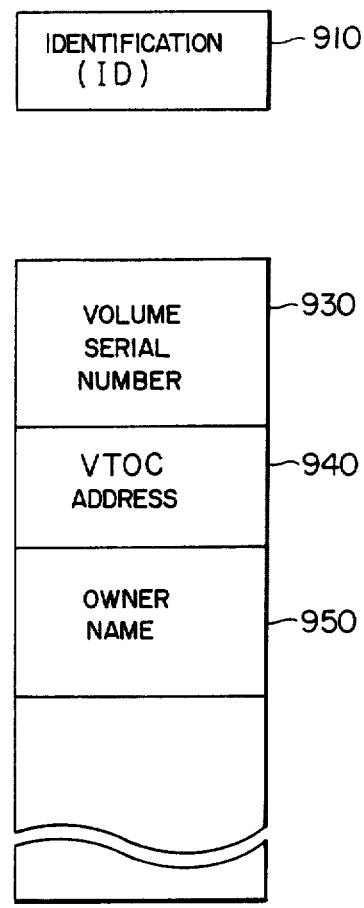
FIG. 3 shows the format of a standard volume label.

FIG. 3 shows the content of the standard volume label 40. In FIG. 3, an identification field (ID) 910 stores therein characters such as "VOL 1" indicating the standard volume label 40, and a volume serial number field 930 stores therein letters such as "01" which is an identification number of the magnetic disk volume 4. A VTOC address field 940 stores therein a start address (CCHH) of the VTOC 42 and an owner field 950 stores therein a name of an owner of the magnetic disk volume 4.

Figure 4:
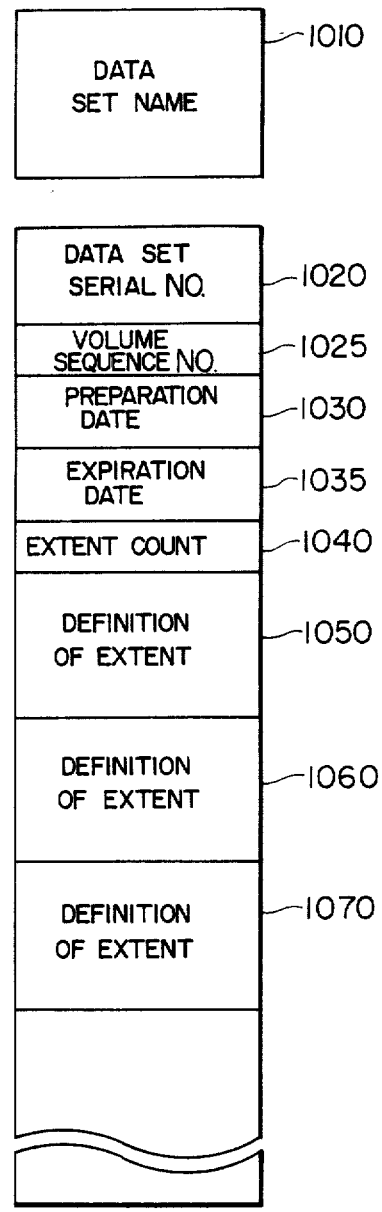
FIG. 4 shows the format of a VTOC (Volume Table Of Contents)

FIG. 4 shows the content of a VTOC field 42. One VTOC field 42 is provided for each data set. A data set name is recorded in a data set name field 1010, a volume serial number of the first volume which contains the data set is recorded in a data set serial number field 1020, an identification number for a sequence of volumes which contain the data set is recorded in a volume sequence number field 1025, a date of preparation of the data set is recorded on a preparation date field 1030, a date on which the data set may be erased is recorded on an expiration date field 1035, the extent of the data set, that is, the number of serial areas therein is recorded in an extent count field 1040, and an upper limit address, a lower limit address and an extent format are recorded in extent definition fields 1050-1070.

In FIG. 2, the protection area defining information 44 is also managed as a data set. Protection area defining information 1650 protects reading of the defining information itself, and protection area defining information 2660 protects a portion of the data set B 640. No protection area defining information is set to the data set A and the data set A is not protected in its entire area.

In the present embodiment, the protection area defining information is provided one for each area to be protected, not for each data set.

When a new data set is to be recorded on the magnetic disk volume 4, a known initialization program is executed before the preparation of the data set to assure that areas for the standard volume label 40 shown in FIG. 3 and the VTOC 42 shown in FIG. 4 are available.

Then, a known data management program is executed and a new data set as well as a corresponding VTOC 42 are prepared, and a VTOC address 940 is recorded in the standard volume label 40.

When an area of an existing data set is to be expanded, an unused area on the magnetic disk volume 4 is allotted to the data set.

When an existing data set is to be deleted, the area on the magnetic disk volume 4 occupied by the data set is changed to an unused area.

When the data set area is changed, the information of the VTOC 42 is also updated.

Figure 5:
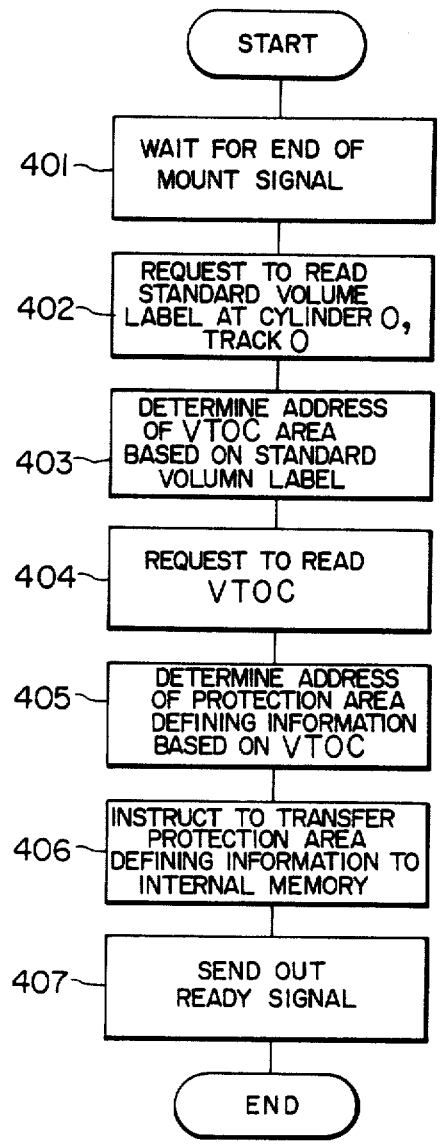
FIG. 5 is a flow chart showing the control operation performed by the protection area information input controller 22.
Figure 6:
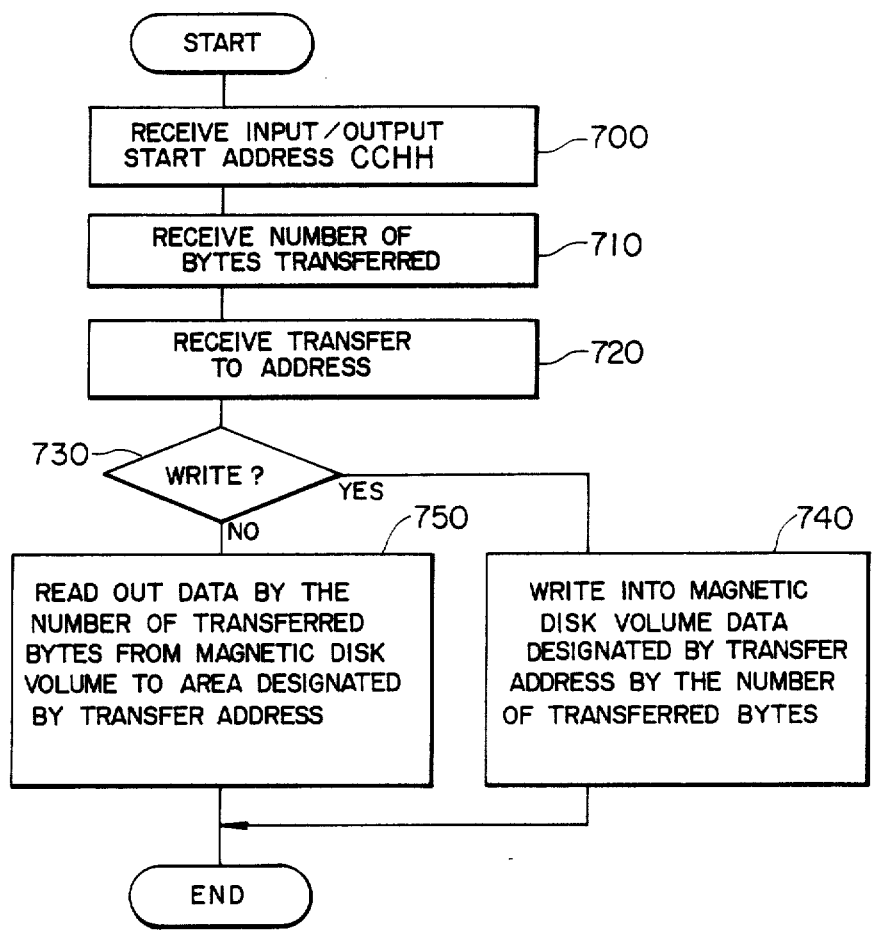
FIG. 6 is a flow chart showing the control operation performed by the data transfer controller 3.

FIG. 5 shows a flow chart of the control operation performed by the protection area information input controller 22, and FIG. 6 shows a flow chart of the control operation performed by the data transfer controller 3.

Referring to FIGS. 5 and 6, the control for mounting the magnetic disk volume 4 on the storage unit 5 and storing the protection area defining information 44 on the magnetic disk volume 4 into the internal memory 23 of the storage unit 5 will be explained.

When the magnetic disk volume 4 is mounted on the storage unit and it reaches a steady rotating speed, an arm of the magnetic disk volume 4 is positioned at cylinder 0, track 0. Then, the mount detector 21 sends an end of mount signal to the protection area information input controller 22 through a control line 110.

Figure 7:
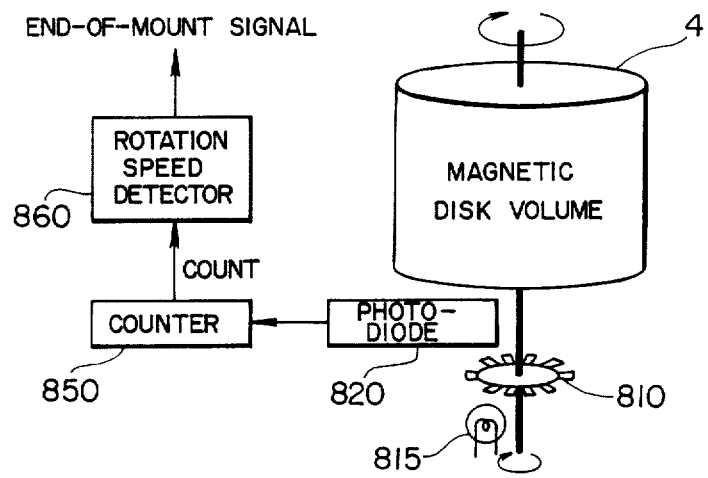
FIG. 7 is a diagram showing the configuration of a mount detector 21.

The mount detector 21 is a conventional one. For example, as shown in FIG. 7, a slit plate 810 is rotated with the magnetic disk volume 4 and a photo-diode 820 detects the interruption of light emitted from a light source 815 to generate pulses which are counted by a counter 850. The rotating speed is determined according to the count, and when a rotating speed detector 8601 detects a steady rotating speed, it sends out the end of mount signal on line 110.

Referring to FIGS. 5 and 6, the protection area information input controller 22 waits for the end of mount signal from the mount detector 21 (step 401), and when it receives the end of mount signal on line 110, it signals to the data transfer controller 3 through a control line 109 to request the input of the standard volume label 40 stored at cylinder 0, track 0 on the magnetic disk volume 4 (step 402). When the data transfer controller 3 receives the request, it receives the input/output start address CCHH, the number of bytes transferred, and a transfer-to address (steps 700-720), and reads out the standard volume label 40 from the magnetic disk-/volume 4 via line 107 (step 750) and transfers it to the protection area information input controller 22 via data line 108.

Since the standard volume label 40 stores therein the start address (cylinder number and track number) of the VTOC 42, the protection area information input controller 22 determines the address of the VTOC 42 based on the received standard volume label 40 (step 403) and requests the input from of the VTOC 42 to the data transfer controller 3 through the control line 109 (step 404). When the data transfer control mechanism 3 receives the input/output start address CCHH, the number of bytes transferred and the transfer-to address (steps 700-720), it reads out the data of the VTOC 42 from the magnetic disk volume 4 via data line 107 (step 750), and transfers it to the protection area information input controller 22 via the data line 108. The VTOC 42 stores therein the start addresses of the protection area defining information field 44, and the protection information input controller 22 determines the address of the protection area defining information field 44 based on the data of the VTOC 42 (step 405), and instructs-to the data transfer controller 3 through the control line 109 to transfer the protection area defining information 44 to the internal memory 23 (step 406). The data transfer controller 3 receives the input/output start address CCHH, the number of bytes transferred and the transfer-to address (steps 700-720), reads out the protection area defining information 44 from the magnetic disk volume 4 via data line 107 (step 750), and sequentially stores it in the internal memory 23 via the data line 106. When the protection area information input controller 22 finishes storing the protection area defining information 44 in the internal memory 23, it sends a READY signal to the host computer 1 through the control line 104 indicating that the access to the magnetic disk volume 4 is ready (step 407). Thus, the transfer of the protection area defining information 44 into the internal memory is terminated.

Figure 8:
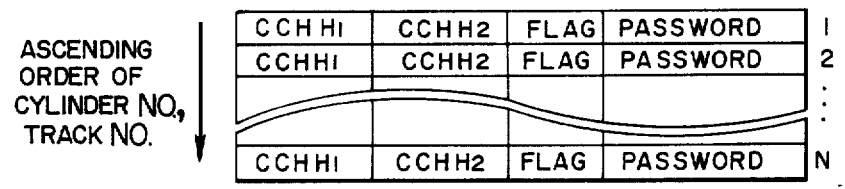
FIG. 8 shows the format of protection area defining information 44 in an internal memory.

FIG. 8 shows the format of the protection area defining information 44 stored in the internal memory 23. $CCHH_1$ indicates the start cylinder number and track number of the protection area in the maqnetic disk volume 4, and $CCHH_2$ indicates the end cylinder number and track number of the protection area. A range specified by $CCHH_1$ and $CCHH_2$ is a region to be protected from invalid accessing. FLAG indicates either a write protection or a read protection. PASSWORD is an identification code for permitting access to a read-protected area. The protection area defining information 44 is prepared for each extent of the data set, that is, for each physically continuous area. FIG. 8 shows N sets of protection area defining information arranged in an ascending order of the cylinder number and track number and stored in the internal memory 23.

Figure 9:
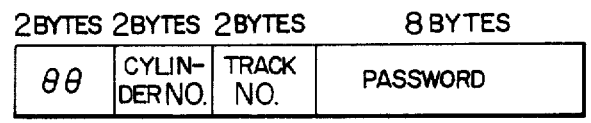
FIG. 9 shows the format of data designated by a SEEK command.

FIG. 9 shows the format of data used to access the magnetic disk volume 4 from the host computer 1. When the host computer 1 accesses the magnetic disk volume 4, it generates the cylinder number and track number designated by a SEEK command, and a password and sends them to the protection area access decision controller 25 through the data line 101.

Figure 10:
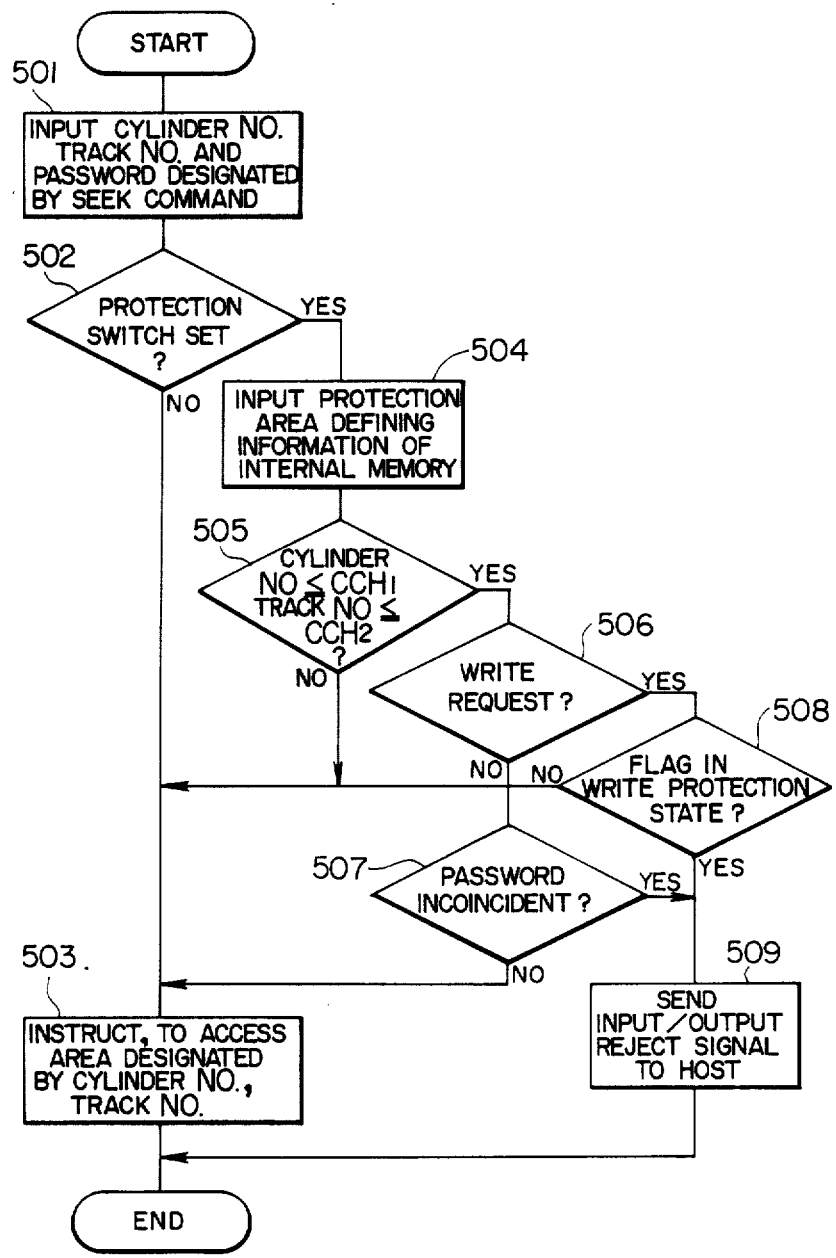
FIG. 10 is a flow chart showing the control operation performed by the protection area access decision controller 25.

FIG. 10 is a flow chart showing the control operations of the protection area access decision controller 25 when the host computer 1 sends access data thereto.

Referring to FIGS. 10 and 6, the control provided by the protection area access decision controller 25 now will be explained.

When the protection area access decision controller 25 receives the cylinder number and track number and the password specified by the SEEK command from the host computer 1 (step 501), it checks to determine whether the protection switch 24 is in its set position or not (step 502), and if the protection switch 24 is not in the set position, it sends the received cylinder number and track number to the data transfer controller 3 via the data line 105 and instructs the accessing of the magnetic disk volume 4 (step 503). The data transfer controller 3 receives the input/output start address CCHH, the number of bytes to be transferred and the transfer-to address (steps 700-720) and reads or writes the data from or to the corresponding area of the magnetic disk volume 4 via the data lines 103 and 107. (steps 750 and 740)

On the other hand, if the protection switch 24 is in the set position, the protection area access decision controller 25 receives the protection area defining information 44 stored in the internal memory 23 via the data line 111 (step 504) and checks to determine if the cylinder number and track number sent from the host computer 1 are within the range between $CCHH_1$ and $CCHH_2$ of the internal memory 23 (step 505). If the access request is not directed to a protection area, the program proceeds to the step 503, and if the access request is directed to a protection area, the controller 25 checks to see if the access request is a write request (step 506).

When the host computer 1 issues a read instruction to a protection area of the magnetic disk volume 4, the protection area access decision controller 25 correlates the password sent from the host computer 1 with the password stored in the internal memory 23 (step 507), and if they are equal, the program proceeds to the step 503, but if they are unequal, the controller 25 sends an access reject (inhibit) signal to the host computer 1 via the control line 102 (step 509) to reject the accessing. If the host computer 1 issues a write instruction to the protection area, the protection area access decision controller 25 checks to see if the flag in the corresponding protection area defining information in the internal memory 23 indicates write protection (step 508), and if it does not indicate write protection, the program proceeds to the step 503, but if it indicates write protection, the controller 25 sends a write reject signal to the host computer 1 (step 509).

The writing of the protection area defining information 44 into the magnetic disk volume 4 by a manager of the magnetic disk volume now will be explained.

The protection switch 24 may be a key switch like a terminal operator key. When the protection switch 24 is in the set position, the protection area access decision controller 25 checks the data designated by the SEEK command (step 502), and if the protection switch 24 is in the reset position, the controller 25 does not check the data designated by the SEEK command, but the program proceeds to the step 503. Accordingly, when the protection area defining information 44 is to be written into the magnetic disk volume 4, the manager of the magnetic disk volume 4 resets the protection switch 24 by use of a key and inputs an address of the protection area (e.g. data set name, CCHH), a type of protection (e.g. read or write) and a password so that the protection area defining information 44 as shown in FIG. 8 is prepared. It is then written into the field of the protection area defining information 44 in the magnetic disk volume 4.

After the writing of the protection area defining information 44, the manager of the magnetic disk volume sets the protection switch 24. Thus, when the magnetic disk volume 4 is again mounted, the corresponding area in the magnetic disk volume 4 is protected from invalid accessing.

In the present embodiment, the protection switch 24 is a key switch. Alternatively, it may be an identification code known only to the manager of the magnetic disk volume. In this case, the validity of the input identification code is checked in the step 502 by the protection area access decision controller 25.

In the above embodiment, protection area defining information is provided for each of the areas to be protected so that the protection is attained area by area. Alternatively, such information may be provided for each of the data sets to be protected so that the protection is attained data set by data set. In this case, in the format of the protection area defining information 44 shown in FIG. 8, the start address ($CCHH_1$) and the end address ($CCHH_2$) of the protection area in the magnetic disk volume 4 are replaced by the data set name. When the host computer 1 accesses the magnetic disk volume 4, it sends the data set name and the password to the protection area access decision controller 25 via the data line 101, and the controller 25 carries out the following operations, depending on the set or reset position of the protection switch 24.

If the protection switch 24 is not in the set position, the controller 25 instructs the controller 3 to effect of accessing the magnetic disk volume 4. On the other hand, if the protection switch 24 is in the set position, the controller 25 receives the protection area defining information 44 via the data line 111, and if the data set name designated by the host computer 1 is not contained in the protection area defining information 44, the controller 25 instructs the controller 3 to effect of accessing the magnetic disk volume 4, but if the data set name is contained in the protection area defining information 44, the controller 25 checks to see if it is a write request. When the host computer 1 reads out the data set stored in the magnetic disk volume 4, the protection area access decision controller 25 correlates the password sent from the host computer 1 with the password in the protection area defining information 44 in the internal memory 23, and if they are equal, the controller 25 instructs the controller 3 to effect accessing of the magnetic disk volume 4, but if they are unequal, the controller 25 inhibits the accessing.

When the host computer 1 writes the data set, the protection area access decision controller 25 instructs the controller 3 to effect accessing of the magnetic disk volume 4 if the flag in the protection area defining information 44 in the internal memory 23 does not indicate a write protection, and the controller 25 inhibits the accessing if the flag indicates a write protection.

In the above embodiments, it is assumed that the data set is contained in one magnetic disk volume. If one data set is contained over a plurality of magnetic disk volumes, the protection area defining information may be stored in at least one magnetic disk volume.

In the above embodiments, it is assumed that the host computer issues an access request to the magnetic disk volume. The access request need not be issued by the host computer but it may be an access request issued by an operator.

In accordance with the embodiments shown and described above, the manager of the magnetic disk volume can protect the data in the magnetic disk volume from being unjustly accessed by the control program of the host computer or an operation of the operator.

While the present invention has been shown and described in connection with a magnetic disk volume, it is apparent that the present invention is applicable to a storage volume other than a magnetic disk volume.

As described hereinabove, in accordance with the present invention, the storage unit can protect the data in its own storage volume. Accordingly, the leakage of the data or destruction of the data due to improper programming, malfunction or system error can be prevented.

I claim:
1. A data processing system including a data processor, and a storage unit connected to said data processor and having a removable storage volume mounted thereon for storing data and an internal memory, said storage volume storing respective protection key information for protecting each of a plurality of data areas in said storage volume from unauthorized access by said data processor and being response to an access request from said data processor for reading or writing data stored therein, comprising:
    first means provided in said storage unit and responsive to the mounting of said storage volume on said storage unit for automatically storing into said internal memory all of the protection key information stored in said storage volume;
    second means provided in said storage unit and responsive to receipt of an access request to effect access to a specific data area accompanied by protection information for that protection information accompanying the access request and protection key information corresponding to the specified data area as stored in said internal memory; and
    third means provided in said storage unit and connected to said second means for controlling access to said specified data area in said storage volume in accordance with a result of the comparison operation by said second means;
    wherein protection area information includes a start address and an end address of a data area to be protected in said storage volume, and said second means includes means for determining if the data area designation information of an access request designates a data area in said storage volume in a range between the start address and the end address included in a protection key information stored in said internal memory.

2. A data processing system according to claim 1 wherein an access request from said data processor includes data designation information for designating a data area of said storage volume to be accessed, wherein each protection key information includes protection area information indicating a data area in said storage volume to be protected and related control information for permitting or inhibiting access to said data area, wherein said second means includes means for comparing the data area designation information included in an access request with protection area information in said internal memory and for comparing protection information accompanying an access request with related control information, and wherein said third means operates to inhibit access to said storage volume when no comparison is found by said second means.

3. A data processing system according to claim 1, further comprising fourth means for generating an access permission signal to control said third means irrespective of the result of the comparison operation by said second means, and wherein said third means includes means for permitting transfer access to said storage volume in response to the access permission signal.

4. A data processing system according to claim 3 wherein said fourth means includes manually operable switch means for generating said access permission signal.

5. A data processing system according to claim 1 wherein said protection information accompanying an access request includes a password, and said second means includes means for checking the correspondence between the password in said protection information and control information stored in said internal memory.

6. A data processing system according to claim 1 wherein protection area information includes a data set name of a data set to be protected in said storage volume, and said second means includes means for determining if data area designation information in an access request matches a data set name in protection area information stored in said internal memory.

7. A method of protecting data in a storage volume of a data processing system including a data processor, and a storage unit connected to said data processor and having a removable storage volume mounted thereon for storing data and an internal memory, said storage volume storing respective protection key information for protecting each of a plurality of data areas on said storage volume from unauthorized access by said data processor and being responsive to an access request from said data processor for reading or writing data stored therein, comprising the steps of:
    automatically storing into said internal memory all of the protection key information stored in said storage volume in response to the mounting of said storage volume on said storage unit;
    receiving in said storage unit an access request to effect access to a specific data area accompanied by protection information for that specific data area;
    comparing in said storage unit until the protection information accompanying a received access request and the protection key information corresponding to the specified data area of the access request as stored in said internal memory upon receipt of an access request from said data processor; and
    controlling in said storage unit access to said storage volume in accordance with a result of the comparing step:
    wherein an access request from said data processor includes data designation information for designating a data area of said storage volume to be accessed, wherein each protection key information includes protection area information indicating a data area of said storage volume to be protected and related control information for permitting or inhibiting access to said data area, wherein said comparing step includes comparing the data area designation information included in an access request with said protection area information in an internal memory and comparing protection information with related control information, and wherein said controlling step includes inhibiting access to said storage volume when no comparison is found during said comparing step.

8. A method according to claim 7, further comprising the step of generating an access permission signal to effect access to said storage volume irrespective of the result of said comparison operation, and wherein said controlling step includes permitting an access to said storage volume in response to an access permission signal.

9. A method according to claim 8 wherein said generating step includes operating a manual switch for generating said access permission signal.

10. A method according to claim 7 wherein said protection information accompanying an access request includes a password, and said comparing step includes checking the correspondence between the password in said protection information and control information stored in said internal memory.

11. A method according to claim 7 wherein protection area information includes a start address and an end address of a data area to be protected in said storage volume, and said comparing step includes determining if the data area designation information of an access request designates a data area in said storage volume in a range between the start address and the end address included in a protection key information stored in said internal memory.

12. A method according to claim 7 wherein protection area information includes a data set name of a data set to be protected in said storage volume, and said comparing step includes determining if the data area designation information in an access request matches a data set name in protection area information stored in said internal memory.

* * * * *